April 18, 1933.  J. OKILL  1,904,747
DEVICE FOR MEASURING AND INDICATING FLUID PRESSURES
Filed March 12, 1931  2 Sheets-Sheet 1
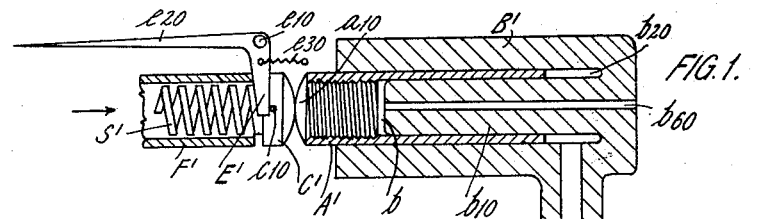
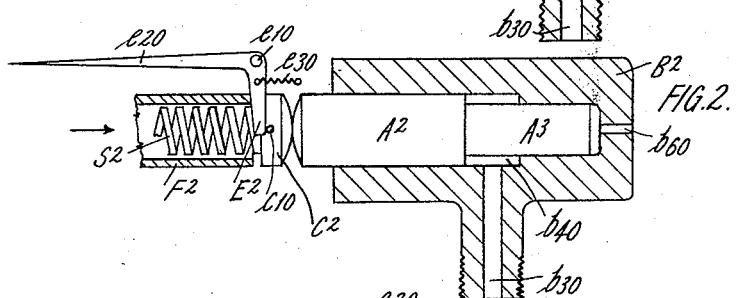
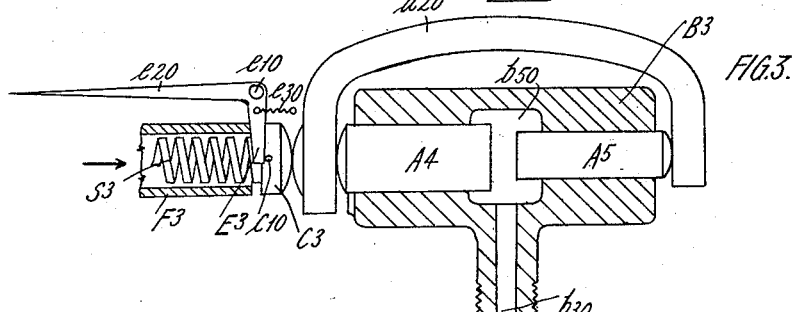
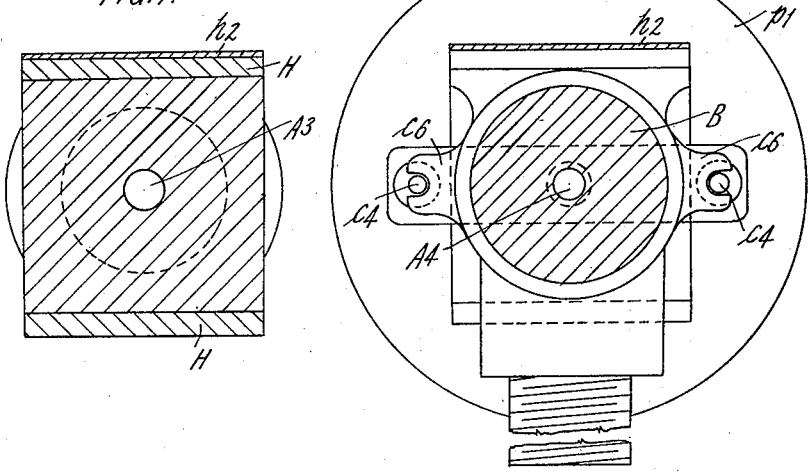

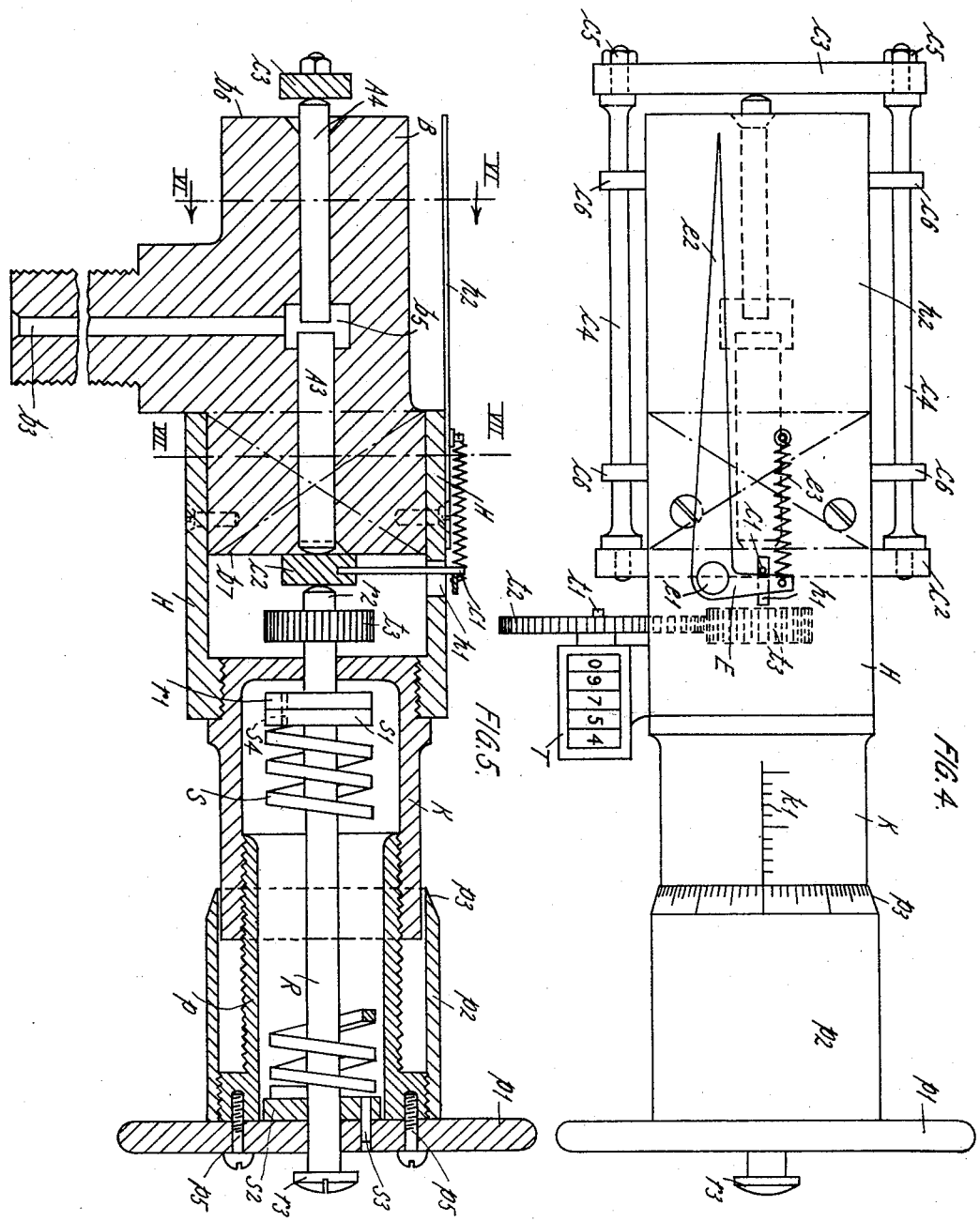

Patented Apr. 18, 1933

1,904,747

UNITED STATES PATENT OFFICE

JOHN OKILL, OF BIRKENHEAD, ENGLAND

DEVICE FOR MEASURING AND INDICATING FLUID PRESSURES

Application filed March 12, 1931, Serial No. 522,088, and in Great Britain March 15, 1930.

This invention relates to pressure indicators, for measuring and indicating fluid pressures, which whilst applicable for measuring a steady pressure are specially applicable for measuring maximum pressures obtained in cycles of pressure variations, such for example as occur in the cylinders of internal combustion engines, fuel injection pumps, air compressures, steam engines, or the like.

In the usual construction of this type of indicator a piston, the movement of which is limited by fixed stops, works in a cylinder and is subject to the pressure to be measured, and the said pressure tends to force it against one of the said stops; when a measurement is to be made a counter-balancing force, transmitted through a helical spiral spring, is applied to the piston, which force is increased until it is just sufficient to keep the piston clear of the said stop, and means are provided to indicate the change in length of the spring which is a measure of the said pressure; and the object of the present invention is to improve the construction of this type of indicator so as to render it specially applicable for the measurement of exceptionally high pressures, such for example as fuel injection pressures for Diesel engines or the like.

In the ordinary type of instrument the area of the piston upon which the pressure to be measured is exerted is of the order of .25 sq. in.; such an instrument when used to measure the high pressures at which the fuel is injected into cylinders of Diesel engines would require an exceptionally heavy counter-balancing spring; the difficulty may to some extent be met by reducing the area of the piston, but, for constructional reasons the extent to which the piston diameter may be reduced is limited.

According to the present invention, the shape of the part subjected to the pressure to be measured is such that the effective pressure thereon is equal to the product of the said pressure per unit area and an area much less than the total area of the said part; the said part may have a portion of its area relieved from the said pressure, or the pressure may be exerted on each of the opposite and unequal sides of the said part; the said pressure in the one direction being nearly counterbalanced by that exerted in the opposite direction; the dimensions of the said part may therefore be maintained large enough to give the necessary strength and permit the accurate fitting and grinding necessary to ensure a sliding fluid-tight joint of requisite axial length with the walls of the enclosing cylindrical chamber. This may be accomplished by making the piston a hollow cylindrical piston, its interior and exterior surfaces respectively fitting exterior and interior cylindrical surfaces forming fixed parts of the casing in which it works, so that the pressure to be balanced by the spring is that due to the pressure to be measured exerted on the annular end area only of the piston; or the piston may be made a differential diameter piston, the portions of large and smaller diameter fitting corresponding cylindrical bores of the casing, the smaller piston balancing the pressure on the larger piston by an amount corresponding with its area, so that the effective pressure on the differential piston which has to be balanced by the spring is that of the fluid to be measured on the annulus between the two parts of the piston; or two pistons of unequal diameter, working in corresponding cylindrical bores in a suitable casing may be arranged so that their adjacent ends are located in a chamber subject to the pressures to be measured, the opposite ends of the pistons extending through the casing and being connected by an external bridge-piece moving between fixed stops in which case the pressure to be balanced by the spring is that due to the pressure to be measured exerted on an area equal to the difference between the areas of the pistons.

I have illustrated my invention in the accompanying drawings, in which:—

Figs. 1 to 3 are diagrammatic elevations in longitudinal medial cross-section illustrating respectively the several modifications referred to; and Figs. 4, 5 and 6 illustrate the general arrangement and details of construction of a preferred modification.

Fig. 1 shows the arrangement in which the pressure to be measured acts on the annular end of a hollow piston.

Fig. 2 shows the arrangement in which the said pressure acts on the annular shoulder of a piston having differential diameters; and Fig. 3 shows the arrangement in which the piston is composed of two parts of differing diameter, and in which the pressure transmitted to the spring is equal to the pressure to be measured exerted on an area equal to the difference in area between the two pistons.

Fig. 4 is an elevation in outside view.

Fig. 5 an elevation in longitudinal section, the plane of section being at right angles to the plane of projection of Fig. 4.

Fig. 6 a plan view in section on the line VI, VI of Fig. 5; and

Fig. 7 a plan view in section on the line VII, VII of Fig. 5.

Referring first to Fig. 1:—

A′ is a hollow piston, the thickness of wall of which is small in proportion to its diameter and it is a close ground fit in the annular space $b20$ formed between the bore of the cylinder B′ and the central fixed plug $b10$ usually concentric with the said bore. In the diagram the plug $b10$ is shown integral with the cylinder B′, but would of course be made separately and be fixed in position in the cylinder so as to be retained in concentric position in the bore and make the necessary closing joints. $b30$ is the inlet communicating with the inner end of the annular space $b20$, which inlet is connected in any suitable manner with the pressure to be measured and in some cases may be screw-threaded to fit the standard tapped openings provided in engine cylinders for indicator fittings. The outer end of the piston A′ is closed by a screwed plug $a10$ which has a convex outer surface bearing against the convex surface of a washer C′ which can be subjected to the regulable pressure exerted by a spiral spring S′, the free end of which bears on the washer and the other end of which is moved axially by suitable means which record the degree to which the spring is compressed, and therefore the pressure which it exerts on the piston A′. $c10$ is a pin attached to the washer C′ and this pin bears against the side of a lever E′ fulcrumed at $e10$ and fitted with a spring $e30$ which tends to retain the level in contact with the pin $c10$. $e20$ is a pointer to indicate the balancing point. F′ is a fixed abutment which limits the outward movement of the washer C′, the amount of such outward movement being just sufficient to provide a readily observable deflection of the pointer $e20$.

Assuming the inlet $b30$ to be connected to the pressure to be measured and that the compression of the spring S′ is relaxed, the washer C′ would be forced against the abutment F′. When the spring S′ is compressed by forcing its upper end inwardly the pressure on C′ would be increased until it just balances the force exerted by the pressure to be measured on the annular end of the piston A′; excess pressure forces the pin A′ on to the stop formed by the top $b$ of the plug $b10$ at the balancing point there is a small vibratory movement between the stops F′ and $b$; the occurrence of this balancing point is observed by the flickering movement of the pointer $e20$ caused by the said small vibratory movement. The degrees of compression of the spring is measured in any convenient way, usually by means graduated to give readings directly in pounds per square inch.

Where the pressure to be measured passes through a cycle during which it varies from a minimum to a maximum value, the said maximum value is indicated in the manner described.

Referring now to Fig. 2;—the arrangement is similar to Fig. 1 except that the piston is, in this arrangement, made in two parts A2, A3 differing in diameter by an amount which is small as compared with the diameters of either of them. In this arrangement the inlet $b30$ communicates with an annular space $b40$ intermediate the piston A2 and the shoulder of the bore in which the piston A2 fits; and it will be seen that the outward force to be balanced by the spring is that due to the pressure to be measured acting on an annulus, the area of which is equal to the difference between the area of the part A2 and the part A3; in other respects the action is similar to that described. A vent $b60$ to prevent accumulation of the pressure below the piston A3, and the bottom of the smaller bore may act as one of the stops.

As stated it is difficult to ensure the necessary accuracy of fit when a single piston has two surfaces of differing diameters which have to fit corresponding surfaces of the cylinder, and this object is removed in the arrangement illustrated diagrammatically in Fig. 3.

In Fig. 3 the cylinder B3 has two bores preferably concentric, opening at opposite ends into a central chamber $b50$, one bore corresponding with the piston A4 and the other corresponding with the piston A5, the diameters of which differ by an amount which is small compared with the diameter of either of them. Each piston is free to move into alignment with its respective bore but relative outward movement between the two pistons is prevented by a yoke $a20$ bearing on opposite ends of the pistons, and such bearings may be oppositely set convex surfaces as described in connection with the plug $a10$ and washer C3 of Fig. 1.

A convex surface on the yoke piece $a20$ bears against the convex surface of the lower side of the washer C3 and the arrangement in other respects is similar to that described in connection with Figs. 1 and 2. The pressure to be measured exerts pressure in the one direction on the piston A4, and in the opposite direction on the piston A5, and therefore the pressure to be balanced on the washer C3 is equal to that exerted by the pressure to be measured on an area equal to the difference between the cross-sectional areas A4 and A5.

It will be seen that in each of the modifications described the diameter of the piston may be made sufficiently large to transmit the pressures exerted, and to provide working cylindrical surfaces sufficiently large in diameter to ensure, in the manufacture, that the accuracy of fit which is necessary may be obtained by grinding or the like process, and, further, that with this construction the pressure to be balanced by the measuring spring is equal to that exerted by the pressure to be measured on an area which is a fractional part only of the area corresponding with the diameter of the piston.

It will be seen that the axial movement of the pressure actuated device, A' Fig. 1, A2, A3 Fig. 2, and A4, A5 Fig. 3, is limited by two stops; these stops are in Fig. 1 the abutment F' and the end $b$ of the plug $b10$, in Fig. 2 the abutment F2 and the end of the cylinder in which the piston A3 works, and in Fig. 3 the abutment F3 and the end of the cylindrical casing B3.

The arrangement illustrated in Figs. 4, 5 and 6 is similar to that last described.

In the arrangement of Figs. 4, 5 and 6, as before, A3 and A4 are the pistons, B the cylinder, $b3$ the connection to the pressure to be measured which connection opens into the space $b5$ communicating with both bores. In this arrangement instead of forming a yoke $a20$ as shown diagrammatically in Fig. 3 the yoke is formed of a cross-bar $c2$, which takes the place of the washer C in the modifications described, this cross-bar $c2$ is connected to a cross-bar $c3$ by side rods $c4$ passing through locating gaps in lugs $c6$, the lower screwed ends of the rod screw into tapped holes in the cross-bar $c2$, and the rods are secured to the cross-bar $c3$ by the nuts $c5$. The convex end of the piston A4 bears against the cross-bar $c3$ and the convex end of the larger piston A3 bears against the cross-bar $c2$. The ends $b6$ and $b7$ of the cylinder engage the respective cross-bars for the limiting stops. Movement of the cross-bar $c2$ is indicated in a manner similar to that described in connection with a washer C, that is to say, a pin $c1$ fixed to the cross-bar $c2$ bears against the side of the lever E fulcrumed at $e1$ and provided with springs $e3$ which tend to keep it in contact with the pin $c1$; the lever E is provided with a pointer $e2$ which flickers as the balancing point is reached.

The cylinder B is secured in position in the upper end of a U-shaped frame H, having an opening $h1$ through which the pin $c1$ protrudes and this frame carries the fulcrum of the lever E and a suitable dial $h2$ across which the pointer $e2$ moves. The spring S is located in a spring casing K, the upper end of which screws into a screw-threaded opening in the transverse portion of the frame H. The interior outer end of the casing K is screw-threaded to take the external screw-threaded portion of the compression sleeve P. $p1$ is a suitable hand-wheel secured to the sleeve P by the screws $p5$ and $p2$ is an external sleeve fitting the cylindrical casing K and having a bevelled upper edge $p3$ which is graduated and which in conjunction with the transverse graduations $k1$ on the sleeve K, enable the extent of axial movement of the sleeve P to be measured; the fractions of a revolution being given by the scale on $p3$ and complete revolution being given by the scale K.

A pressure transmission rod R is provided having fixed thereto a pressure ring $r1$, and the spiral spring is, after the manner of a steam engine indicator spring, fitted with integral end rings $s1$ and $s2$, which rings are provided with pins $s3$ and $s4$, the former preventing angular movement of the spring relatively to the sleeve P and the latter preventing angular movement of the ring $r1$ and rod R relatively to the spring and sleeve P; the rod R is carried through an opening in the hand-wheel $p1$ as at $r3$; the spring and the rod R therefore rotate with the sleeve P. The outer end of the rod has a convex surface $r2$ which bears on the cross-bar $c2$, and transmits the spring pressure to the connected pistons A3 and A4.

When the force due to the pressure to be measured, acting on an area equal to the difference between the areas of the pistons A3 and A4, is balanced by the degree of compression of the spring as indicated by the flickering of the pointer $e2$, the magnitude of the said pressure in pounds per square inch may be read-off on the scales on beveled edge $p3$ and $k1$. The actual pressure transmitted by the spring is of course a fractional part only of the force which would be exerted by the pressure to be measured on the area of either pistons alone, this ratio being taken into account in graduating the scales, when made to read directly in pounds per square inch.

Where it is desired to read the pressure directly in numbers, as recorded by a revolution counter of the Veeder or other well-known type, the spindle $t1$ of a counter T is connected by the spur wheel $t2$ to a pinion $t3$ keyed to the rod R. When the spring S is uncompressed the readings given by the scales $p3$ and $k1$, and the reading given by the counter is zero; when the hand-wheel $p1$ is turned so as to rotate the sleeve P and compress the spring until the balancing point is released, it will be seen that the reading on the counter will be a function of the number of revolutions made by the sleeve P, and therefore of the degree of compression necessary to enable the spring to balance the pressure to be measured; the readings of the counter may, by suitably arranging the pitch of the threads of P, and the number of teeth on the gear wheels $t2$, $t3$ be made to give direct readings of the pressure to be measured.

In some cases instead of convex surfaces between the opposite ends of the pistons and the inner faces of the cross-heads, the pistons may have their opposite ends coned, said cone portions fitting in suitable coned recesses in the cross-heads; such conical arrangements avoid the necessity for guiding the side rods by means of the lugs described, the rotation of the yoke as a whole about the axis of the cones may be prevented by suitably arranging the pin $c1$ which engages the lever E.

The embodiment of the invention illustrated in Figs. 5 to 7 is given by way of example, and the details of construction may be modified in accordance with the size and duty of the apparatus.

The double piston shown in Figs. 4 to 7 may be replaced by the single pistons of Figs. 1 or 2; in this case the yoke would be dispensed with and a washer such as C' or C2 (Fig. 1 or Fig. 2) would be interposed between the end of the rod R and the protruding end of the piston, the construction and action of the apparatus otherwise being as described.

Having now fully described my invention, I declare that what I claim and desire to secure by Letters Patent, is:—

1. In apparatus for measuring fluid pressure, in combination;—a casing having two cylindrical surfaces of different diameters, the space between the surfaces being provided with a passageway adapted to be connected to the pressure to be measured; a pressure actuated device having two cylindrical surfaces adapted respectively to make a fluid-tight sliding fit with the said two respective cylindrical surfaces; two stops limiting the movement of the said device, against one of which stops the latter is pressed when subject only to the pressure to be measured; a regulable balancing spring adapted to transmit a measurable pressure to the pressure-actuated device tending to move it away from the said stop; a measuring device for indicating the pressure transmitted by the spring to the said device; and balance indicating means comprising a lever actuated by the pressure-actuated device adapted to indicate the movement of the said device in respect to its stops.

2. Apparatus as claimed in claim 1, in which the two cylindrical surfaces of different diameters are arranged in concentric alignment in a casing, the annulus so formed being closed at one end and communicating at the said end with a passage-way adapted to be connected to the pressure to be measured; and in which the pressure actuated device is a cylinder fitting the said annulus, and having one end closed.

3. Apparatus as claimed in claim 1, in which the two cylindrical surfaces of different diameters are formed in a casing in line axially, and in which the pressure actuated device is a two diameter piston, the diameters corresponding with the diameters of the respective cylindrical surfaces, the piston part of smaller diameter being longer than the cylindrical surface of smaller diameter, and the annular space between the smaller piston part and the larger cylindrical surface communicating with a passage-way adapted to be connected to the pressure to be measured.

4. Apparatus as claimed in claim 1, in which the two cylindrical surfaces of different diameters are formed in a casing in line axially, and in which the pressure actuated device comprises two separate pistons, the respective diameters of which correspond with the diameters of the said surfaces, the respective pistons making joint with the respective cylindrical surfaces and the remote ends of the pistons protruding beyond the cylindrical surfaces, and a yoke engaging the said protruding ends so as to limit the movement apart of the two pistons, the inner ends of the cylindrical surfaces opening into a space communicating with a passage-way adapted to be connected to the pressure to be measured.

5. In apparatus for measuring fluid pressure, in combination;—a cylinder having two open ended bores of different diameters, the space connecting the said bores having a passageway adapted to be connected to the pressure to be measured; a pressure actuated device consisting of two pistons respectively fitting the said bores, and a yoke engaging the pistons so as to limit their movement apart; a bridge piece attached by one end to the cylinder and having at the other end a screw-threaded bore; a spring casing, the lower end of which is screw-threaded to fit the said screw-threaded bore, and the upper end of which is internally screw-threaded, a graduated spring presser sleeve fitting said internally screw-threaded end of the spring casing; a collared pressure bar axially traversing the said casing and sleeve and the lower end of which is adapted to transmit pressure to the said yoke; a spiral spring interposed between the collar on the said bar and the graduated spring presser sleeve; and a balance indicating means comprising a pointer actuated by the yoke.

6. In apparatus for measuring fluid pressure, in combination;—a pressure actuated device including two pistons of different diameters arranged in line and connected together; a cylinder having two bores in which the two pistons respectively are a fluid-tight sliding fit; a rotatable collared pressure bar bearing on the said pressure actuating device; a fixed screw-threaded part; a presser sleeve screwing into said fixed screw-threaded part and connected to the said bar so as to rotate therewith; a balancing spring interposed between the collar on the rod and the said presser sleeve, and adapted to be compressed as the said sleeve is rotated; a spur pinion on the bar; a counter; and spur gearing between the said pinion and the counter; the ratio of the spur gearing in relation to the strength of the spring being so arranged that the counter directly indicates the pressure transmitted by the spring to the said pressure-actuated device.

7. Apparatus for measuring fluid pressure, in combination;—a casing having two open ended bores of different diameters communicating with a space having a passage-way adapted to be connected to the pressure to be measured; a pressure actuated device consisting of a pair of pistons adapted to fit the said bores and a yoke comprising a pair of cross-bars united by tie-rods, cross-bars abutting against the protruding ends of the pistons and being limited in movement by the plane surfaces of the casing end; a bridge piece secured at one end of the casing having a screw-threaded interior, a spring presser sleeve having a screw-threaded part to fit the screw-threaded portion of the spring casing, a pressure bar fitted with a collar, and extending through the spring casing and the sleeve, the lower end of which bar abuts on the upper cross-bar of the yoke; a spiral spring interposed between the collar on the pressure bar and the screwed sleeve, the bar, the spring and the screwed sleeve being connected together so as to rotate together; a spur wheel on the said bar; a counter; and gearing connecting the said pinion to the counter; and balance indicating means comprising a bell-crank lever pivoted to the bridge piece, a radially extending pin connected to the upper cross-bar, and a spring adapted to hold the short arm of the lever in contact with the said pin.

8. Apparatus as claimed in claim 7, in which the edge of the annular portion of the screwed pressure sleeve is circumferentially graduated and in which the spring casing is longitudinally graduated so as to indicate the degree of compression of the balancing spring.

9. Apparatus as claimed in claim 7, in which the pressure rod extends through the screw-threaded spring presser sleeve so that the said rod may be manipulated by means of the protruding part.

10. Apparatus as claimed in claim 7, in which the long arm of the bell-crank lever is shaped to form a pointer, and in which a scale for the said pointer is formed on a dial plate attached to the bridge piece.

11. In apparatus for measuring fluid pressure, in combination;—a cylindrical casing having two open-ended bores of different diameters, the space connecting the inner ends of the said bores communicating with the passage-way adapted to be connected to the pressure to be measured, a pressure actuated device consisting of two separate pistons respectively fitting the said bores, and the remote ends of which are adapted to protrude through the said bores, a yoke consisting of two cross-bars, said bars respectively engaging the protruding ends of the respective pistons, and being connected together by tie rods disposed externally to the cylindrical casing, an axially movable rod in line with the pistons, and one end of which engages the cross-bar of the yoke in contact with the protruding end of the piston of larger diameter, a collar on the said cross-bar, a cylindrical spiral spring one end of which engages the said collar, means for moving the other end of the spring relatively to the collar, means for measuring the said movement, and balance indicating means comprising a pointer actuated by the yoke.

In testimony whereof I affix my signature.

JOHN OKILL.